United States Patent
Johnson

[11] Patent Number: 6,039,525
[45] Date of Patent: Mar. 21, 2000

[54] INTEGRATED SPRING RING RETAINER FOR CAPTIVATING A FASTENER TO A WORKPIECE

[76] Inventor: H. Thad Johnson, 9002 Hidden Trail, Davisburg, Mich. 48350

[21] Appl. No.: 09/176,482

[22] Filed: Oct. 21, 1998

[51] Int. Cl.[7] ........................................... F16B 21/18
[52] U.S. Cl. ........................ 411/353; 411/512; 411/999
[58] Field of Search .................................. 411/353, 372, 411/512, 533, 970, 999, 437

[56] References Cited

U.S. PATENT DOCUMENTS

| | | | |
|---|---|---|---|
| 1,409,606 | 3/1922 | Standahl | 411/353 |
| 1,572,770 | 2/1926 | Colley . | |
| 1,788,408 | 1/1931 | Raybould | 411/999 |
| 2,374,743 | 5/1945 | Granville . | |
| 2,409,516 | 10/1946 | Rosenthal | 411/999 |
| 2,709,470 | 5/1955 | Knohl | 411/999 |
| 2,761,484 | 9/1956 | Sternick | 411/999 |
| 2,931,412 | 4/1960 | Wing . | |
| 3,008,368 | 11/1961 | Hammitt et al. . | |
| 3,083,796 | 4/1963 | Bell, Jr. . | |
| 3,090,203 | 5/1963 | Durget . | |
| 3,137,195 | 6/1964 | Rosenberg . | |
| 3,217,774 | 11/1965 | Pelochino . | |
| 3,221,847 | 12/1965 | Attwood . | |
| 3,250,559 | 5/1966 | Sommerfeld | 411/999 |
| 3,262,480 | 7/1966 | Storch . | |
| 3,447,229 | 6/1969 | Clark . | |
| 3,452,636 | 7/1969 | Cohen et al. . | |
| 3,474,847 | 10/1969 | Bedford | 411/999 |
| 4,306,708 | 12/1981 | Gassaway | 411/999 |
| 4,309,123 | 1/1982 | Moore . | |
| 4,334,599 | 6/1982 | Ritsema et al. . | |
| 4,435,112 | 3/1984 | Becker . | |
| 4,607,992 | 8/1986 | Mauritz et al. . | |
| 4,732,519 | 3/1988 | Wagner . | |
| 4,844,677 | 7/1989 | Schwartzman | 411/512 |
| 4,971,497 | 11/1990 | Stoffer et al. . | |
| 4,979,858 | 12/1990 | Van Allman et al. . | |
| 4,999,019 | 3/1991 | Kraus | 411/512 |
| 5,094,579 | 3/1992 | Johnson . | |
| 5,141,357 | 8/1992 | Sherman et al. . | |
| 5,154,559 | 10/1992 | Wagner . | |
| 5,165,834 | 11/1992 | Takenouchi | 411/533 |
| 5,199,152 | 4/1993 | Wagner . | |
| 5,209,620 | 5/1993 | Zare-Ardestani . | |
| 5,255,647 | 10/1993 | Kiczek | 411/353 |
| 5,328,311 | 7/1994 | Knohl . | |
| 5,395,194 | 3/1995 | Johnson et al. . | |
| 5,509,752 | 4/1996 | Kocisek | 411/353 |
| 5,662,444 | 9/1997 | Schmidt, Jr. . | |
| 5,664,922 | 9/1997 | Janssen | 411/533 |
| 5,711,711 | 1/1998 | Schmidt, Jr. . | |

FOREIGN PATENT DOCUMENTS

| | | |
|---|---|---|
| 3706616 | 9/1988 | Germany . |
| 855297 | 11/1960 | United Kingdom . |
| 929149 | 6/1963 | United Kingdom . |

*Primary Examiner*—Flemming Saether
*Attorney, Agent, or Firm*—Harness, Dickey & Pierce, P.L.C.

[57] ABSTRACT

A technique for captivating a fastener in a workpiece which finds particular utility where the workpiece has a smooth, polished bore. A retainer is provided between the bore of the workpiece and the fastener which is designed so that there is good adhesion between the outer diameter of the retainer and the inner diameter of the polished inner surface of the workpiece without also increasing the adhesion between the inner diameter of the retainer and the outer diameter of the fastener to thereby allow some axial play or slippage of the fastener relative to the retainer. In such manner the fastener will not pop free from the workpiece upon experiencing external axial forces on the fastener. Preferably, the retainer also allows radial and tilting movement of the fastener to facilitate the final threading process.

13 Claims, 2 Drawing Sheets

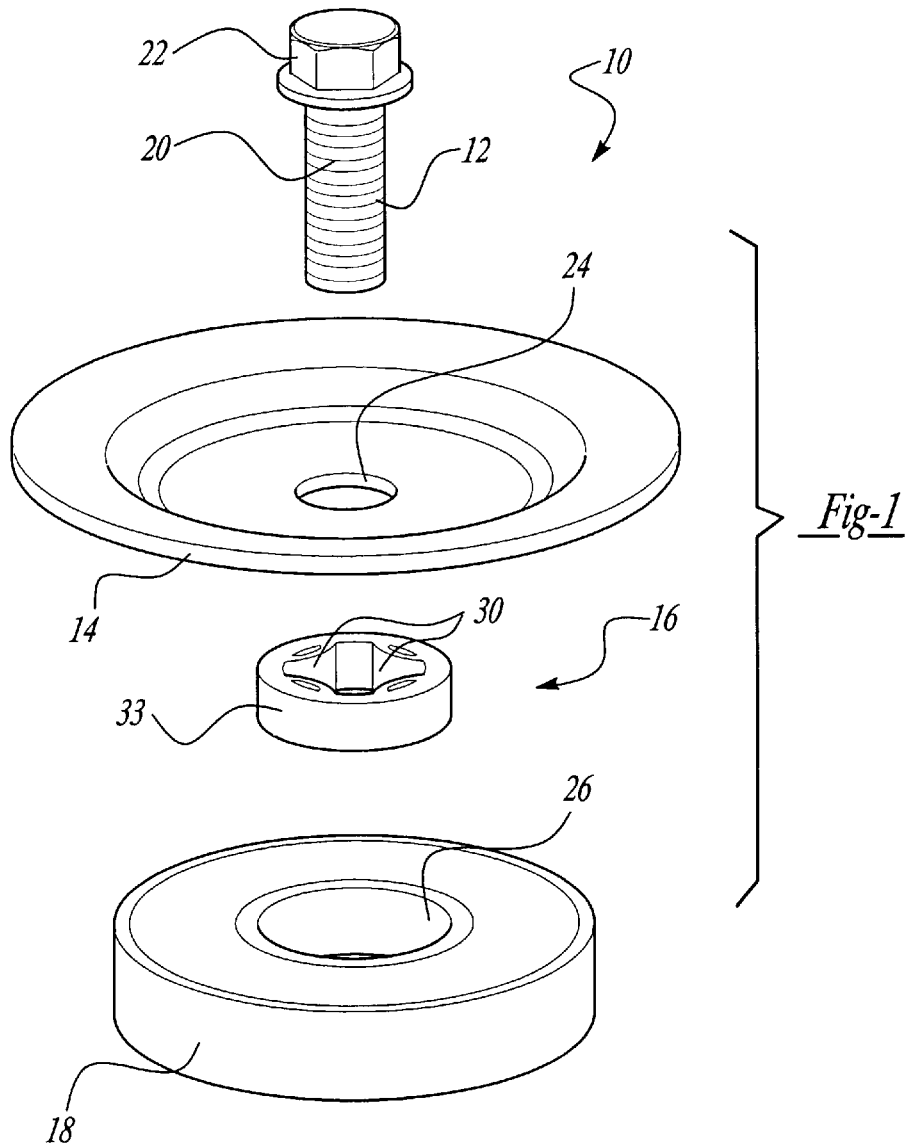
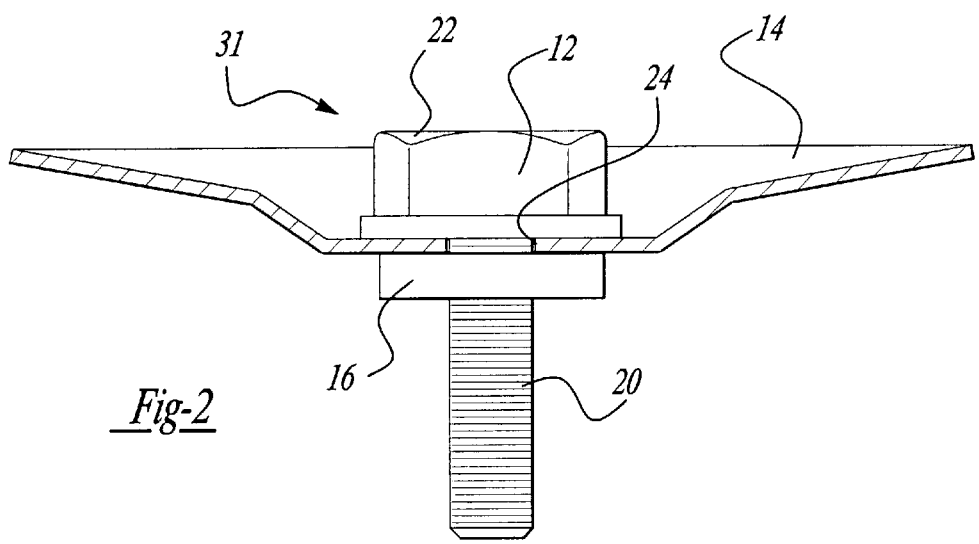

INTEGRATED SPRING RING RETAINER FOR CAPTIVATING A FASTENER TO A WORKPIECE

BACKGROUND OF THE INVENTION

1. Field of the Invention

This invention relates generally to fastener retainers and, more particularly, to assemblies for captivating a fastener within a workpiece.

2. Discussion

Manufacturers are constantly striving to increase productivity by reducing assembly time during the manufacturing process. It is known in the art to streamline manufacturing by pre-attaching the fasteners to structural members which are later used in the assembly of a component.

Some representative examples of prior art techniques for captivating fasteners on a workpiece include U.S. Pat. Nos. 5,199,152 and 5,154,559. These patents generally disclose the use of wings or protuberances on the fastener shank. The workpiece is formed with a radially inwardly projecting shoulder portion in its bore. The diameter of the fastener wings is slightly larger than the inner diameter formed by the bore shoulder such that the fastener can be forced through the workpiece so that the shoulder in the bore can still engage the wings of the fastener. U.S. Pat. No. 5,328,111 also requires that the workpiece bore have an area of reduced diameter to maintain a C-shaped clip/fastener preassembly captivated within the workpiece. Another approach is disclosed in U.S. Pat. No. 5,395,194 where a convoluted flexible retainer member serves to captivate the fastener within the workpiece.

Special problems are encountered when the bore of the workpiece is a straight walled polished surface such as the inner bore of a bearing assembly. In such instances the wing/protuberance approaches of the '559 and '152 patents, as well as the design of the '111 patent, is not acceptable because these techniques require that the inner bore of the workpiece be formed with special inwardly projecting portions. In some workpieces, such as bearing assemblies, it is either impractical or undesirable to form such projections within the bore. As will be described later herein, a split-ring retainer member has been employed in an attempt to captivate the fastener within a bearing assembly. However, this technique suffers from several disadvantages. The split-ring is slid over the shank of the fastener and the fastener/split-ring is then press fit into the bore of the bearing assembly. This assembly is then, in turn, press fit into a pulley of a belt tensioner of an accessory drive component for an automobile. This assembly is typically placed into shipping containers with other similar assemblies and then shipped to the final manufacturing plant. Of course, the assemblies tend to experience the usual shaking and jostling during normal shipment. At the plant, the assembly is then mounted to a tapped hole in a bracket in the engine compartment. The worker typically grasps the assembly with one hand and tries to visually align the bolt with the hole in the bracket. Sometimes the worker mis-aligns the bolt with the hole and hits the protruding end of the fastener against the bracket. This force has a tendency to pop-out the fastener (and its split-ring) from the bearing. To some extent, this "pop-out" of the fastener/split ring can occur during shipment as well. In either case, this defeats the purpose of producing the preassembly in the first place.

Therefore, it would be desirable to provide a cost-efficient and effective technique for preassembling a fastener to a workpiece, especially where the workpiece has a very smooth inner bore.

SUMMARY OF THE INVENTION

In accordance with the teachings of the present invention, a technique for captivating a workpiece is disclosed which has particular utility for use with a workpiece that has a smooth, slippery bore. A retainer device has an outer ring portion and a plurality of radially extending arch portions. The outer diameter of the ring portion is slightly larger than the bore of the workpiece and the inner diameter defined by the arches is slightly smaller than the outer diameter of the shank of the fastener. The arches engage the shank of the fastener in such a manner that the fastener is allowed at least some axial movement. The retainer is press fit into the bore of the workpiece. The ring portion is designed so the compression forces from the press fit do not unduly radially load the arches so that the fastener can still slide within the retainer. Therefore, the fastener will slide somewhat in the retainer if it experiences an external force instead of carrying the retainer with it and popping free from the assembly.

The novel features of this invention include not only the construction of the retainer but also the preassembled workpiece/fastener combination as well as a method of assembly.

BRIEF DESCRIPTION OF THE DRAWINGS

The various advantages and features of the present invention will become apparent to those skilled in the art after having the benefit of reading the following specification and by reference to the drawings in which:

FIG. 1 is an exploded perspective view of a captivated fastener assembly made in accordance with the teachings of this invention;

FIG. 2 is a cross-sectional view illustrating the preassembly of a bolt, washer and retainer;

DESCRIPTION OF THE PREFERRED EMBODIMENT

Figure 3:
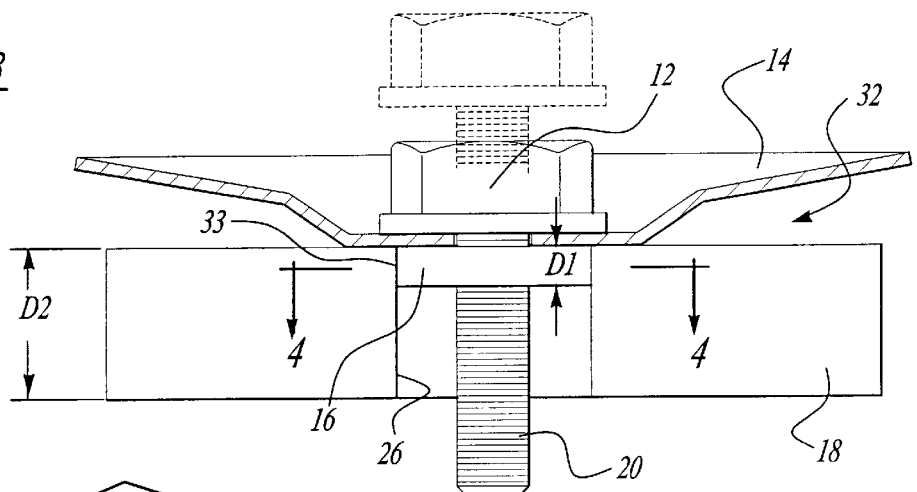
FIG. 3 is a cross-sectional view illustrating the preassembly of FIG. 2 mounted in the workpiece.

It should be understood from the outset that while this invention will be described in connection with the best mode currently contemplated for practicing the invention, that various other modifications can be made without departing from the spirit and scope of this invention. Therefore, the foregoing specific embodiment should not be construed as being a limiting example of the invention.

FIG. 1 illustrates the major components of a preassembled captivated workpiece assembly 10 according to the teachings of the present invention. There are four major components: a fastener 12, an optional washer 14, a retainer 16 and workpiece 18. In this particular example, the fastener is a conventional threaded bolt having a shank 20 which is threaded along its entire length and a head 22. The washer has a generally dish shape and an aperture 24. The workpiece 18 has a straight-sided polished bore 26 which has slippery inner bore surfaces. By way of a non-limiting example, workpiece 18 is a bearing assembly of the type that is press fit into a pulley of a belt tensioner device. The bore 26 is part of the inner race of the bearing and is typically machined to a very smooth and polished surface. For purposes of this invention, the term "polished" shall mean a smooth bare-metal surface which has not been coated. The inner bore is straight walled, i.e., there are no inward shoulders or protrusions. By way of a specific example, the bearing workpiece 18 has a thickness between the two major faces of about 12 mm, an outer diameter of about 40 mm and an inner bore diameter of about 17 mm.

Figure 4:
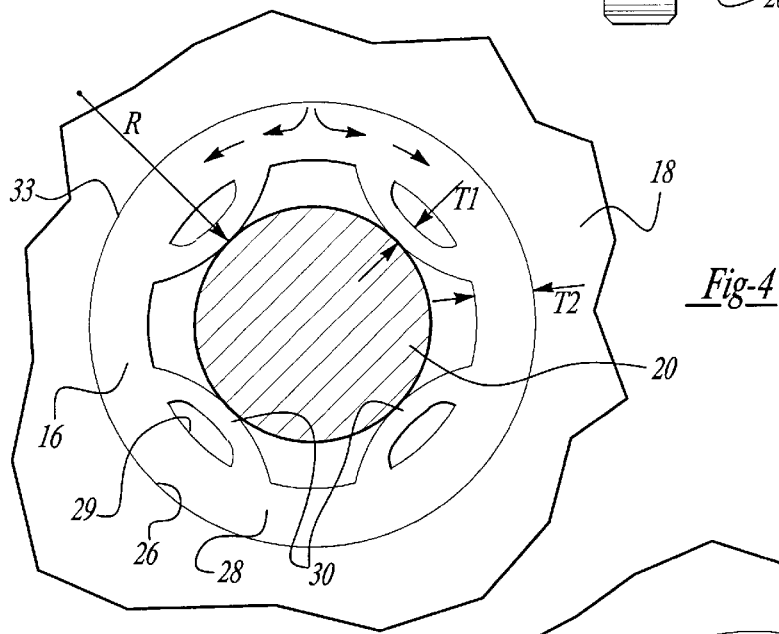
FIG. 4 is across-sectional view along lines 4—4 of FIG. 3.

Special attention should now be drawn to the retainer 16 which is best shown in FIGS. 1 and 4. Retainer 16 is an annular member having an outer ring portion 28 and a plurality of radially inwardly extending arch portions 30. Here there are four diametrically opposite radially inwardly extending arches. The arches are in the form of arcuate portions whose middle are separated from ring portion 28 by oblong slots 29. As will appear, the arches 30 act as leaf springs for engaging the fastener shank 20. The inner diameter formed by the innermost radial projections of arches 30 is slightly smaller than the outer diameter of shank 20. The outer diameter of the ring portion 28 of retainer 16 is slightly larger than the inner diameter of bore 26. By way of a specific example, the outer diameter of the shank 12 is about 10 mm, the inner diameter defined by the arches 30 is about 9.5 mm, and the outer diameter of retainer ring portion 28 is about 17.25 mm.

The retainer is preferably injection molded from a polymer such as low density polyethylene. Other materials which fulfill the functions of this invention can also be used.

Turning now to FIG. 2, the fastener 12, washer 14 and retainer 16 are preassembled by inserting the shank 20 of the fastener through the washer aperture 24. Then, the retainer 16 is slid over the shank 20 from the bottom of the fastener to the position shown in FIG. 2 where the washer 14 is sandwiched between the fastener head 22 and the upper surface of retainer 16. Due to the relative differences between the diameters defined by the retainer arches 30 and the fastener shank 20, the arches tend to deflect somewhat and engage the threads of the shank 20 so that there is sufficient adhesion between the retainer arches 30 and threads on fastener shank 20 to hold them together absent external forces. As will become apparent to those skilled in the art, there are a variety of design constraints in order to provide this function. For example, if the span of the arches is made wider, a weaker adhesive force on the shank will result. The radius "R" and the wall thickness T1 of the arches, as well as the material for the retainer all will affect the spring properties of the arches. However, by appropriate trial and error an appropriate selection of these variables can be obtained depending upon on the size and shape of the various parts to be assembled.

The preassembly 31 of FIG. 2 is then assembled onto the workpiece 18 as shown in FIG. 3. This is accomplished simply by press fitting the retainer 16 into the workpiece bore 26 as shown. The fastener head and bottom of the washer 14 serve as stops so that the top surface of the retainer 16 is about flush with the top surface of workpiece 18. Also note the differences between the axial depths between the retainer 16 and workpiece 18. The depth D1 of retainer 16 is less than 50 percent and, more preferably, less than 25 percent of the depth D2 of workpiece 18. By keeping the depth of retainer 16 relatively small, the workpiece bore 26 can receive a larger length of a shaft or the like about which the bearing turns.

If the end of the fastener 12 experiences an externally applied axial force, the fastener 12 will slide axially through the gripping surfaces of the arches 30 while the radially outer surfaces of retainer 16 remain adhered to the inner walls of workpiece bore 26. Thus, the preassembly 30 does not pop free from the workpiece 18. The axial slideability of the retainer/fastener interface is illustrated in the dotted lines of FIG. 3. The arches 30 also allow the fastener to be moved radially and to be tilted during the final assembly process when the shank of the fastener 12 is actually threaded into a tapped hole of a member for receiving the final assembly 32. This play provided by retainer 16 allows the worker to manipulate the fastener to align it with the tapped hole during the final assembly process, yet does not result in the fastener popping from the workpiece 18.

Figure 5:
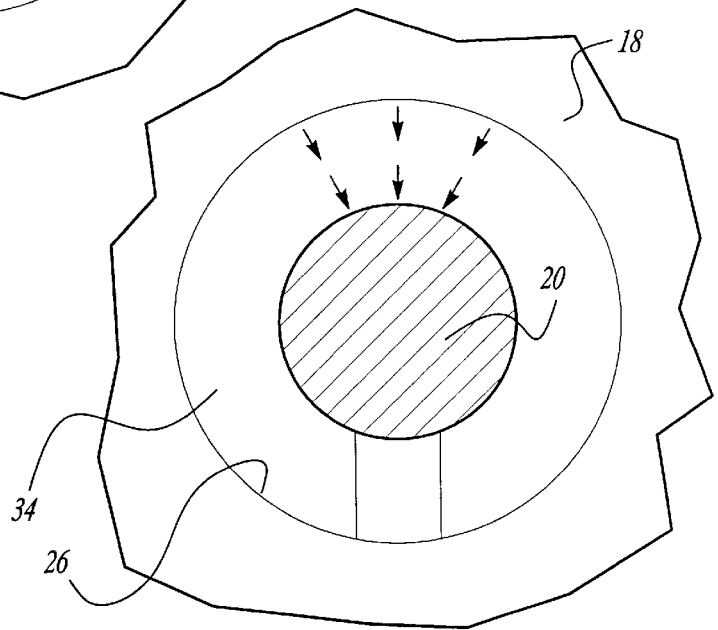
FIG. 5 is a cross-sectional view, similar to FIG. 4, but illustrating a PRIOR ART approach.

The ability of the present invention to allow axial slideability of the fastener upon receipt of such external forces without causing the retainer 16 to pop free from the workpiece 18 is not completely understood. It is believed that it is important for the outer wall 33 of the retainer to present a continuous surface complementary against the inner wall of the workpiece bore 26. As a result, the adhesion between the outer wall of the retainer 16 and the workpiece bore 26 is greater than the adhesion between the fastener shank 20 and the arches 30. The radial thickness T2 of the ring portion 28 appears to be another important consideration. It is believed by making the thickness T2 of the ring portion 28 greater than the thickness T1 of the arches 30 that compression forces from the press fit of the retainer in the workpiece bore will be distributed circumferentially on the ring body and prevent undue radially inward loading on the arches. This is illustrated by the arrows in FIG. 4. In other words, the compression forces are distributed so that they prevent undue deflection of the arches against the fastener shank 20 which would increase the tension on the fastener and prevent it from sliding relative to the retainer. Preferably, the wall thickness 72 of the ring portion 28 is larger than the thickness T1 of the arches 30. More preferably, the thickness T2 of ring portion 28 is at least 1½ times and, most preferably, at least three times the thickness of arches 30. This is in contrast with the prior art approach of FIG. 5. In the prior art a split-ring member 34 is employed. When ring 34 is press fit into the workpiece bore 26 the compression of the press fit is distributed radially inwardly to increase the compression forces of the inner wall of the ring 34 against the fastener shank 20. This is shown by the arrows in FIG. 5. As a result, the split-ring 34 does not allow sufficient axial movement of the fastener 16 if the end of the fastener is hit with an external force thereby causing the fastener to carry the split-ring 34 from the workpiece causing the fastener to pop free from the workpiece.

In view of the foregoing, it can be appreciated that the present invention provides a simple, yet effective technique for solving a somewhat perplexing problem in the industry. Various modification of this specific example should become apparent to those skilled in the art after having the benefit of the teachings of this invention.

What is claimed is:

1. A captivated fastener assembly comprising:

a fastener having a head and a threaded shank having a given outer diameter;

a workpiece having an internal bore of a given diameter; and an annular retainer having a ring portion and a plurality of radially inwardly extending arches, the ring portion having an outer diameter which is greater than the inner diameter of the workpiece bore, the arches defining an inner diameter which is less than the outer diameter of the fastener shank, and the retainer having an outer wall shaped essentially complementary to the shape of the bore to provide a substantially continuous mating surface between the outer wall of the retainer and the inner bore of the workpiece; and the retainer being press fit within the bore of the workpiece, the shaft of the fastener extending through the retainer, the arches engaging the threaded shank sufficiently to captivate the fastener within the workpiece while allowing axial movement of the fastener shank within the retainer to accommodate external forces on the fastener without disengaging the retainer from the workpiece.

2. The assembly of claim 1 wherein the bore of the workpiece is polished and is straight-sided.

3. The assembly of claim 1 wherein the retainer ring portion has a radial thickness which is greater than the radial thickness of the arches.

4. The assembly of claim 1 wherein the arches comprise four diametrically opposite arcuate surfaces.

5. The assembly of claim 1 wherein the retainer is made from a flexible polymeric material.

6. The assembly of claim 1 wherein the retainer has an axial depth less than an axial depth of the workpiece bore.

7. The assembly of claim 1 wherein the workpiece is a bearing and the bore is defined by a polished surface forming part of an inner race of the bearing.

8. The assembly of claim 1 wherein an upper surface of the retainer is located substantially flush with an upper surface of the workpiece.

9. The assembly of claim 1 which further comprises a washer sandwiched between the head of the fastener and an upper surface of the retainer.

10. The assembly of claim 1 wherein the relationship between the shape and size of the ring and arches are such that compression forces from the press fit of the retainer in the workpiece bore are distributed about the ring and do not increase the tension on the arches to such an extent that axial movement of the fastener relative to the retainer would be prevented.

11. A method of captivating a fastener within a workpiece having a bore of a given diameter, said method comprising:

sliding a retainer over a threaded shank of the fastener and engaging flexible radially inwardly extending arches with the threads, said retainer having an outer wall shaped essentially complementary to the shape of the bore to provide a substantially continuous mating surface between the outer wall of the retainer and the inner bore of the workpiece;

press fitting the retainer into the bore of the workpiece such that outer walls of the retainer mate substantially continuously with inner walls of the workpiece bore; and whereby said fastener can slide axially within the workpiece upon experiencing external forces while the retainer remains adhered to the workpiece.

12. The method of claim 11 which further comprises:

injection molding the retainer into an annular member having a ring portion and integrally formed arches.

13. The method of claim 11 wherein the fastener includes a head portion having an outer diameter greater than the diameter of the bore, and wherein the step of press fitting comprises:

moving the fastener relative to the workpiece until a head of the fastener abuts an upper surface of the workpiece thereby automatically locating an upper surface of the retainer substantially flush with an upper surface of the workpiece.

\* \* \* \* \*